(12) United States Patent
Jiang et al.

(10) Patent No.: US 12,113,829 B2
(45) Date of Patent: Oct. 8, 2024

(54) OCCUPANCY DETECTION AND PEOPLE COUNTING USING PASSIVE WIRELESS INTERFACES

(71) Applicants: Yuexin Jiang, Little Neck, NY (US); Biao Chen, Jamesville, NY (US)

(72) Inventors: Yuexin Jiang, Little Neck, NY (US); Biao Chen, Jamesville, NY (US)

(73) Assignee: SYRACUSE UNIVERSITY

( * ) Notice: Subject to any disclaimer, the term of this patent is extended or adjusted under 35 U.S.C. 154(b) by 95 days.

(21) Appl. No.: 17/071,912

(22) Filed: Oct. 15, 2020

(65) Prior Publication Data

US 2021/0112097 A1 Apr. 15, 2021

Related U.S. Application Data

(60) Provisional application No. 62/915,611, filed on Oct. 15, 2019.

(51) Int. Cl.
*H04L 9/40* (2022.01)
*H04L 9/06* (2006.01)

(52) U.S. Cl.
CPC .......... *H04L 63/162* (2013.01); *H04L 9/0643* (2013.01); *H04L 63/1433* (2013.01); *H04L 63/20* (2013.01); *H04L 63/0407* (2013.01)

(58) Field of Classification Search
CPC . H04L 63/162; H04L 9/0643; H04L 63/1433; H04L 63/20; H04L 63/0407
See application file for complete search history.

(56) References Cited

U.S. PATENT DOCUMENTS

| | | | | |
|---|---|---|---|---|
| 7,155,167 B1 * | 12/2006 | Carty | ..................... | H04W 24/00 455/67.11 |
| 9,143,968 B1 * | 9/2015 | Manku | .................. | H04W 16/14 |
| 2015/0161515 A1 * | 6/2015 | Matsuoka | ........... | G06F 16/3334 706/17 |
| 2016/0088438 A1 * | 3/2016 | O'Keeffe | ................ | H04W 4/21 455/456.2 |
| 2018/0350219 A1 * | 12/2018 | Correnti | ................. | G08B 25/08 |
| 2019/0158340 A1 * | 5/2019 | Zhang | .................. | H04B 17/318 |
| 2019/0166030 A1 * | 5/2019 | Chen | ....................... | H04L 7/042 |
| 2019/0379683 A1 * | 12/2019 | Overby | ................. | H04L 67/322 |

* cited by examiner

*Primary Examiner* — Cheng-Feng Huang
(74) *Attorney, Agent, or Firm* — David L. Nocilly; Bond, Schoeneck & King PLLC

(57) ABSTRACT

A method of detecting and quantifying human objects in a given environment by passively observing wireless signals in an interesting environment. Information pertaining to observed wireless signals, such as wireless physical layer data and metadata, encrypted or unencrypted data and metadata in the wireless media-access control layer, and channel state information are extracted from the observed wireless signals and used to detect and quantify human objects in a location. The signals that are observed can originate from a wireless object used by a target of interest, such as cellular phone or workstations, or from infrastructure devices, such as wireless access points, IoT devices, or other transceivers. The signals can also originate from other recognizable signal sources, such as electromagnetic interference introduced by equipment such as elevator motors or microwave ovens.

12 Claims, 9 Drawing Sheets

```
{
  "Radio0":{
    "BSSID": "55:46:A1:24:FD:A1",
    "Channel_Bandwidth": "20MHz",
      "Channel_Frequency": "2437MHz",
      "Tx_power_EIRP": "23dBM",
      "Tx_power":"21dBM",
      "Channel_Utilization_Busy": "14%",
      "Channel_Utilization_Tx": "7%",
      "Channel_Utilization_Rx":"1%",
      "AP_Band_Steering": "OFF",
      "AP_AirTimeFairness": "OFF",
      "AP_Beamforming": "DISABLED",
      "AP_Uplink": "WIRED-1000FDX", "Visible_Stations": {
        "7Df948js(OneWay Hash of MAC)":{
          "type": "associated",
      "rssi": "-70",
      "first_observed": 1602432173,
          "last_observed": 1602432175,
          "tx_rate": "72Mbps",
          "rx_rate": "72Mbps"
        },
        "3515sd55(OneWay Hash of MAC)":{
          "type": "probe-request",
      "rssi": "-67",
      "first_observed": 1602432343,
          "last_observed": 1602432457,
          "tx_rate": "1Mbps",
          "rx_rate": "780Mbps"
        }
      }

```
{
   "ID-48dhu503-d9fi02309":{
      "Observed-by": {
         "Access-Point-1":{
            "observations": {
               "id-1234934":{
                  "type": "probe-request",
                  "timestamp": 1602432973,
                  "rssi": -89
               },
               "id-1234935":{
                  "type": "probe-request",
                  "timestamp": 1602432975,
                  "rssi": -76
               },
               "id-1234938":{
                  "type": "probe-request",
                  "timestamp": 1602432979,
                  "rssi": -69
               },
               "id-1234939":{
                  "type": "associated",
                  "timestamp": 1602432979,
                  "rssi": -51,
                  "tx_rate": "1Mbps",
                  "rx_Rate": "20Mbps"
               },
               "id-1234948":{
                  "type": "associated",
                  "timestamp": 1602432982,
                  "rssi": -51,
                  "tx_rate": "1Mbps",
                  "rx_Rate": "20Mbps"
               },
         },
         "Access-Point-2":{
            "observations": {
               "id-1234934":{
                  "type": "probe-request",
                  "timestamp": 1602432973,
                  "rssi": -72
               },
               "id-1234935":{
                  "type": "probe-request",
                  "timestamp": 1602432975,
                  "rssi": -81
               },
               "id-1234419":{
                  "type": "associated",
                  "timestamp": 1602432979,
                  "rssi": -51,
                  "tx_rate": "1Mbps",
                  "rx_Rate": "144Mbps"
               },
               "id-1234958":{
                  "type": "associated",
                  "timestamp": 1602432982,
                  "rssi": -51,
                  "tx_rate": "1Mbps",
                  "rx_Rate": "1.3Gbps"
```

FIG. 8

OCCUPANCY DETECTION AND PEOPLE COUNTING USING PASSIVE WIRELESS INTERFACES

CROSS-REFERENCE TO RELATED APPLICATIONS

The present application claims priority to U.S. Provisional No. 62/915,611, filed on Oct. 15, 2019.

BACKGROUND OF THE INVENTION

1. Field of the Invention

The present invention relates to occupancy detection and counting of human objects and, more specifically, to an approach for analyzing wireless signals and metadata to determine occupancy information.

2. Description of the Related Art

The advance in wireless communication enables more devices to communicate over-the-air via radio frequency (RF) signals, empowering them with the possibility to communicate anywhere with any other devices on networks in planetary scale. Along with an astronomical amount of data being sent and received, RF communications also generate a considerable amount of metadata, i.e., the data about the data. Metadata is often discarded or left untapped after the transmission is completed. However, it is reasonable to suggest such metadata can provide more value to the cyber and physical space in addition to facilitating a medium for transporting digital data. While leveraging metadata in wireless communication systems to describe other cyber-physical properties has been considered by others in the past, information that has so far been largely neglected is the actual information about the RF propagation channel that is often affected by, and sometimes can be correlated to the presence/movement of humans/objects in the physical environment.

US Pub. No. 2016/0088438 describes the usage of mobile device to assist control of various connected building equipment, using fixed receivers placed in the building, the mobile devices are accessed and programmed to actively transmit pre-defined wireless data known to the receiver in order to detect human presence as a binary value (e.g. physical building space is occupied or vacant). While this system may work for the intended purpose, custom modification to the physical space and prior intrusive access to the user-carrying-devices are required for the system to function.

BRIEF SUMMARY OF THE INVENTION

The present invention exploits the information both in metadata and in the channel variation to achieve presence detection and people counting in a given physical environment. Since the metadata and channel variation information already exist to facilitate the transmission of the actual data over wireless media, and that such metadata and channel variation information can be computed and obtained by either first party or third-party equipment in a given environment. Thus, the present invention does not require intrusive access to user-carried devices. Moreover, as a result, of the wide adoption of wireless communication in residential and commercial applications, the addition of sensing hardware to the physical building is rendered optional by the present invention. Because most places already have WiFi Access Points (and systems) deployed to provide excellent coverage, the present invention can rely on and leverage metadata reported by existing hardware exclusively, thereby making the need to add new hardware to perform occupancy detection and information extraction optional.

The collected metadata, depending on the use case will come from a single or multiple data source (e.g., wireless/Wi-Fi access points) located throughout the interested physical environment. Applications for the present invention include building automation, data analytics and optimization, hazard detection as well as contact tracing where presence/occupancy detection can provide valuable information for energy efficient operation, e.g., occupancy driven lighting/HVAC control for reduced carbon footprint. People counting and crowd density mapping can provide valuable information to business intelligence for improved operational efficiency. Proximity detection where spatial data can be used to support contact tracing purposes.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 7 is an example of metadata that may be used by a system for occupancy detection and counting of human objects according to the present invention;

FIG. 8 is another example of metadata that may be used by a system for occupancy detection and counting of human objects according to the present invention.

DETAILED DESCRIPTION OF THE INVENTION

Figure 1:
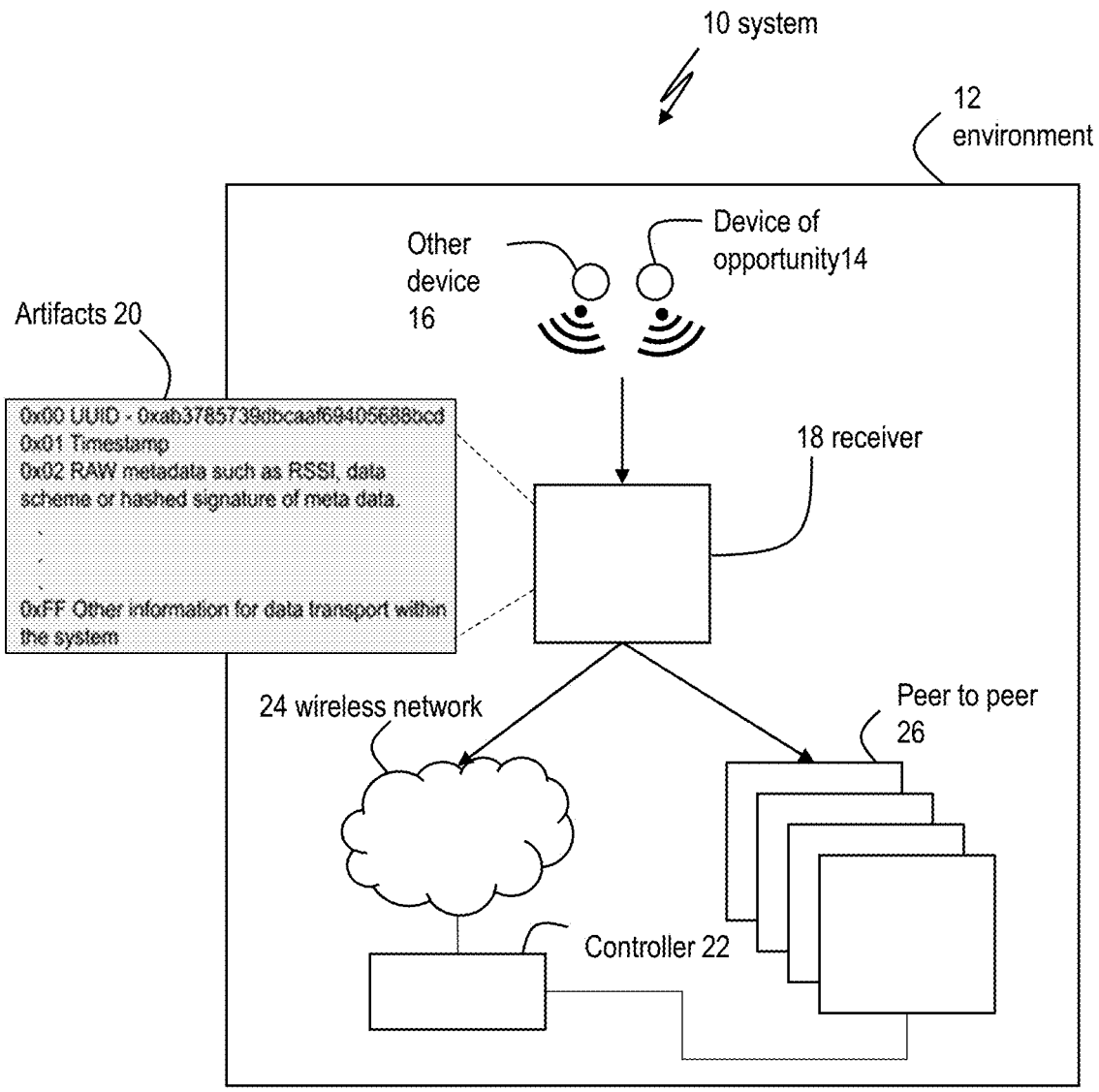
FIG. 1 is a diagram describing the operation flow of a system for occupancy detection and counting of human objects according to the present invention.

Referring to the figures, wherein like numerals refer to like parts throughout, there is seen in FIG. 1 a system 10 for occupancy detection and counting of human objects by passively observing wireless signals in an interested environment 12. Observed signals from one or devices of opportunity 14 and other devices/sources of noise 16 are passively received by a receiver 18. Devices of opportunity 14 may be user device(s), such as cellular phones and workstations, or infrastructure devices, such as wireless access points, or IoT devices, such as wireless environmental sensors or other transceivers. Other devices/sources of noise 16 may be other recognizable signal sources, such as E-M interference introduced by elevator motor(s) or microwave oven(s). Receiver 18 may comprise a dedicated device configured and programmed according to the present invention, or may be a legacy device with preexisting capabilities that can be programmed according to the present invention.

Receiver 18 is programmed to extract information from the observed wireless signals. The information extracted from observed wireless signals can be wireless physical layer information (PHY), such as modulation scheme, spectrum usage, power data/error rate, CSI, etc. The extracted information may further include anonymized or identified data and metadata in media access control layer (MAC) information, such as station MAC, client MAC, RSSI, and other encrypted and unencrypted metadata. The extracted information may additionally include channel state information. The interested raw data and metadata are processed on-device as required by use case, such as anonymizing personally identifiable data. For example, FIG. 1 shows an exemplary artifact 20 generated by receiver 18 based on the information extracted from ambient wireless signals by receiver 18. Receiver 18 is further programmed to generate a unique signature (hash) associated for each device of opportunity 14 or other device 16 producing a signal having information extracted by receiver 18, thereby masking personally identifiable information such as device hardware IDs for privacy purposes. Receiver 18 is further programmed to transmit artifacts 20 to a master controller 22, such as via a wireless network 24. Alternatively, receiver 18 can transmit artifacts 20 to other wireless receivers 18 in a peer-to-peer (P2P) fashion 26. Receiver 18 may be any programmable device that can receive wireless signals and process them according to the present invention. As an example, receiver 18 may comprise a conventional wireless access point that has existing capabilities to receive wireless signals and extract metadata from the signals and that has been additionally programmed to generate artifacts 20 using wireless network data and to send those artifacts 20 to controller 22. Metadata can include data related to a device carried by an occupant (such as the RSII of the user's device as described below), but can also include metadata such as configuration profile of the access point, connection metadata for all other devices in the environment that are either associated (actively connected to the access point) or visible to the access point.

Figure 2:
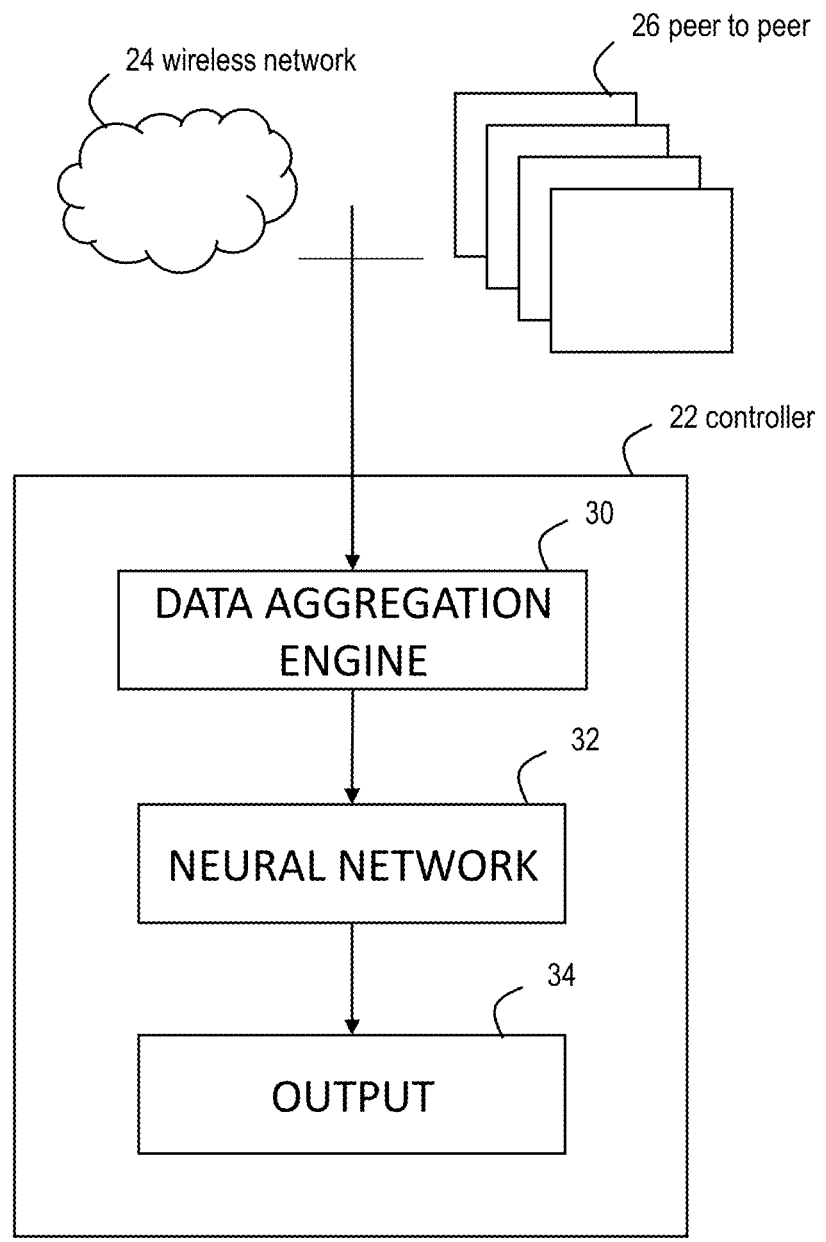
FIG. 2 is schematic of a system for occupancy detection and counting of human objects according to the present invention.

Referring to FIG. 2, master controller 22 includes a data aggregation engine 30 for aggregating data from receivers 18 for further processing by a trained machine learning algorithm, such as neural network 32. Neural network 32 is programmed to analyze the aggregated data provided aggregation engine 30 and to provide an output regarding the results of system 10, such as a determination of the occupancy of the target environment 12. Controller 22 may comprise any hardware component having programmable elements that can receive artifacts 20 from receiver 18. As an example, controller 22 could comprise a wireless network server as such devices already include the capability of communicating wirelessly with receivers 18, particularly if those receivers 18 are conventional wireless access points that have been modified to act as receivers 18 of system 10.

The hardware selected for receiver 18 and controller 22 may be selected depending on the particular use case, NN complexity (i.e., the number of data sources needed to process and what types of data sources are used), and timing requirements (real-time, near real-time, non-real-time/offline). The system can be deployed in various way. As a first example, system 10 could be implemented on dedicated devices, particularly as access points become more powerful, although high performance access points with ARM Cortex-A processors will currently suffice. Controller 22 can be running on a dedicated device, significantly reducing overhead on data serialization and transfer. System 10 may also be implemented locally with a single controller 22. A general-purpose computer, ARM, X86, can either be low power, embedded hardware, virtual machine, workstations, servers (with or without GPU or any other types of accelerator) or dedicated FPGA (for high throughput, real-time use cases). As a third example, a remote cloud controller 22 could be used. Data (from access points or other networked data source) being are then sent over the internet, and some or all detection processing can be done on remote sites, with any acceptable hardware mentioned above acting as controller 22.

System 10 can thus be flexibly deployed by using existing wireless infrastructure without the addition of extra hardware in the environment, or by deploying passive receivers 18 in environments where such infrastructure is not available. A hybrid approach can also be used to provide the best coverage on acquisition of signals of opportunity (SoP). The present invention is agnostic to protocol or standards (e.g., WiFi, Bluetooth, ZigBee etc.) thus can work with a wide variety of signals and metadata, regardless of encryption. The system can also work without any device of opportunity present in the environment. Physical layer information such as channel state information (CSI) can be used to approximate the ambient environment and produce desired output by filtering false positives and negatives. This invention presents a swarm-driven, data fusing method that can significantly increase the output reliability to detect human presence in a given physical environment.

Figure 3:
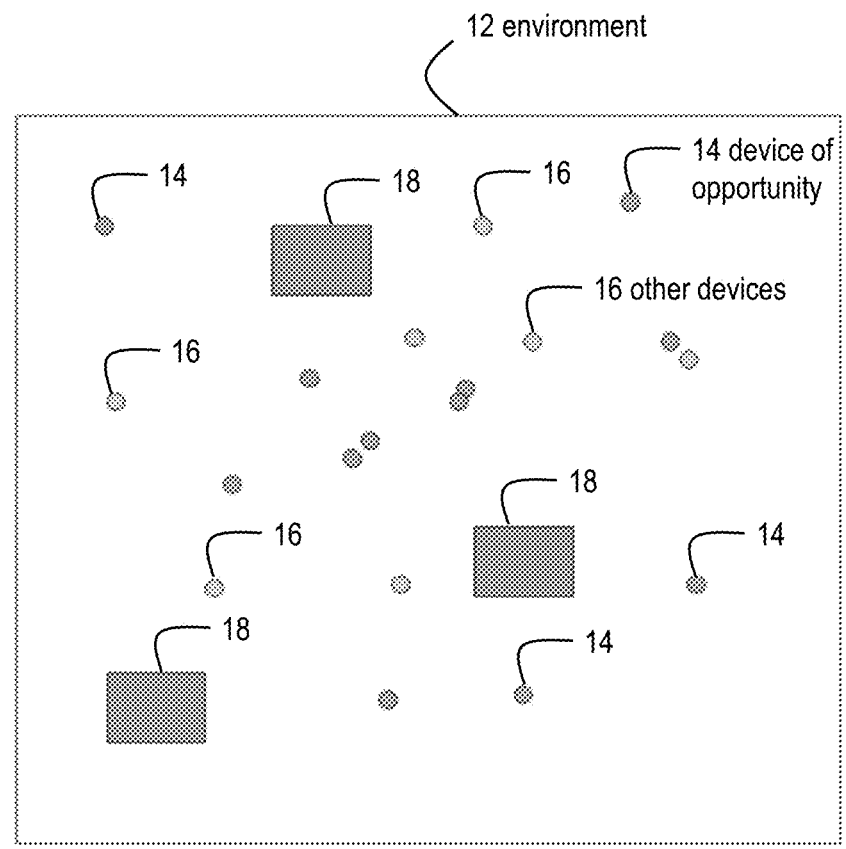
FIG. 3 is a first exemplary deployment of a system for occupancy detection and counting of human objects.
Figure 4:
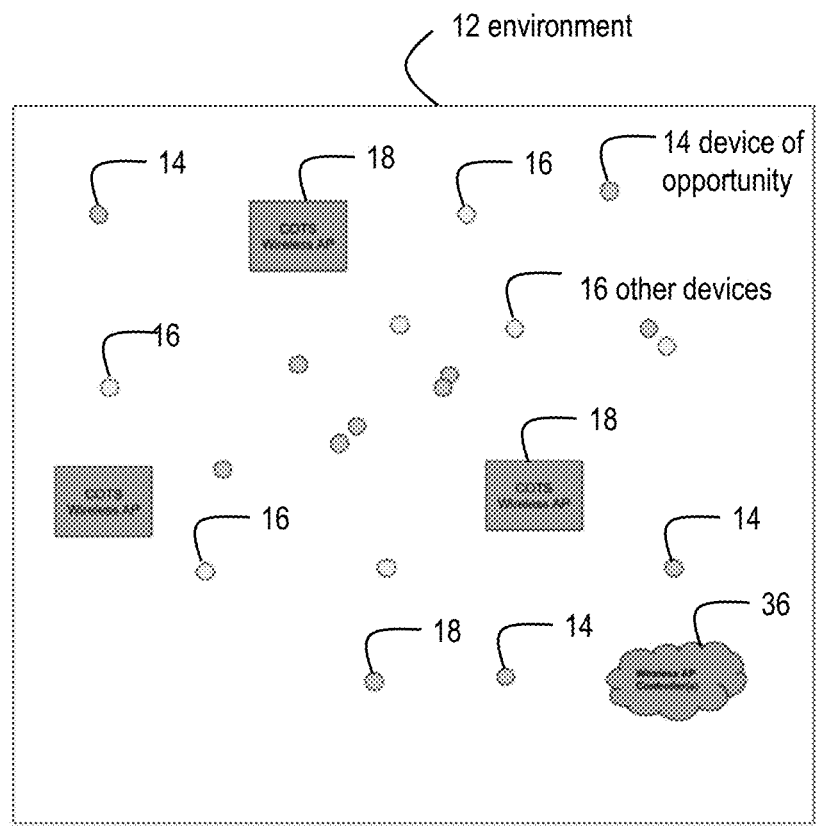
FIG. 4 is a second exemplary deployment of a system for occupancy detection and counting of human objects.

Referring to FIG. 3, receivers 18 may be position within or near interested environment 12 to passively observe wireless transmissions from all devices in environment 12, including multiple devices of opportunity 14 (dark circles) and other devices/sources of noise 16 (light circles). Referring to FIG. 4, system 10 may use existing hardware and infrastructure, such as COTS wireless APs, as receivers 18, in connection with a wireless AP controller 36. System 10 may be implemented with hybrid data sources as system 10 is agnostic with respect to any particular protocols or standards.

Figure 5:
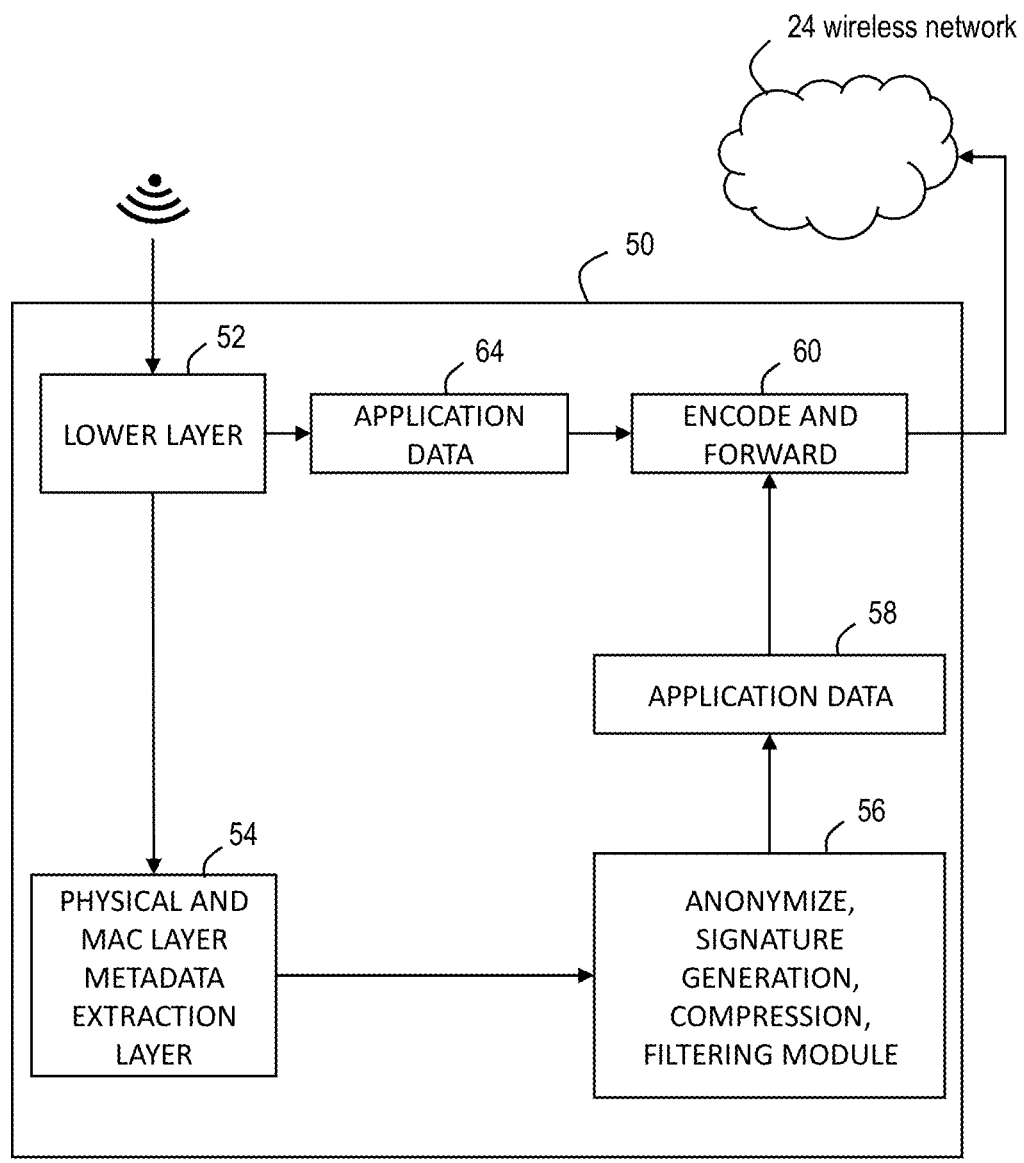
FIG. 5 is a schematic of a system for occupancy detection and counting of human objects according to the present invention.

Referring to FIG. 5, receiver 18 may be implemented in an RF infrastructure device 50, such as a WiFi access point or cell tower. RF infrastructure device 50 passively observes all recognizable signals in the relevant environment 12. RF infrastructure device 50 includes a lower layer 52 comprising a physical and media access control layer for decoding and processing signals. RF infrastructure device 50 further includes a physical and MAC layer extraction layer 54 for extracting the metadata to be used by system 10. RF infrastructure device 50 further includes module 56 for anonymizing the metadata, generating unique signatures to remove personal data and allow for aggregation of metadata related to the same device, and performing any desired compression and filtering. Processed metadata is encapsulated as application data 58 for encoding and forwarding to controller 22, such as via a network 62. Raw data received by lower layer 52 may also be packaged as application data 64 and then encoded and forwarded 60.

Figure 6:
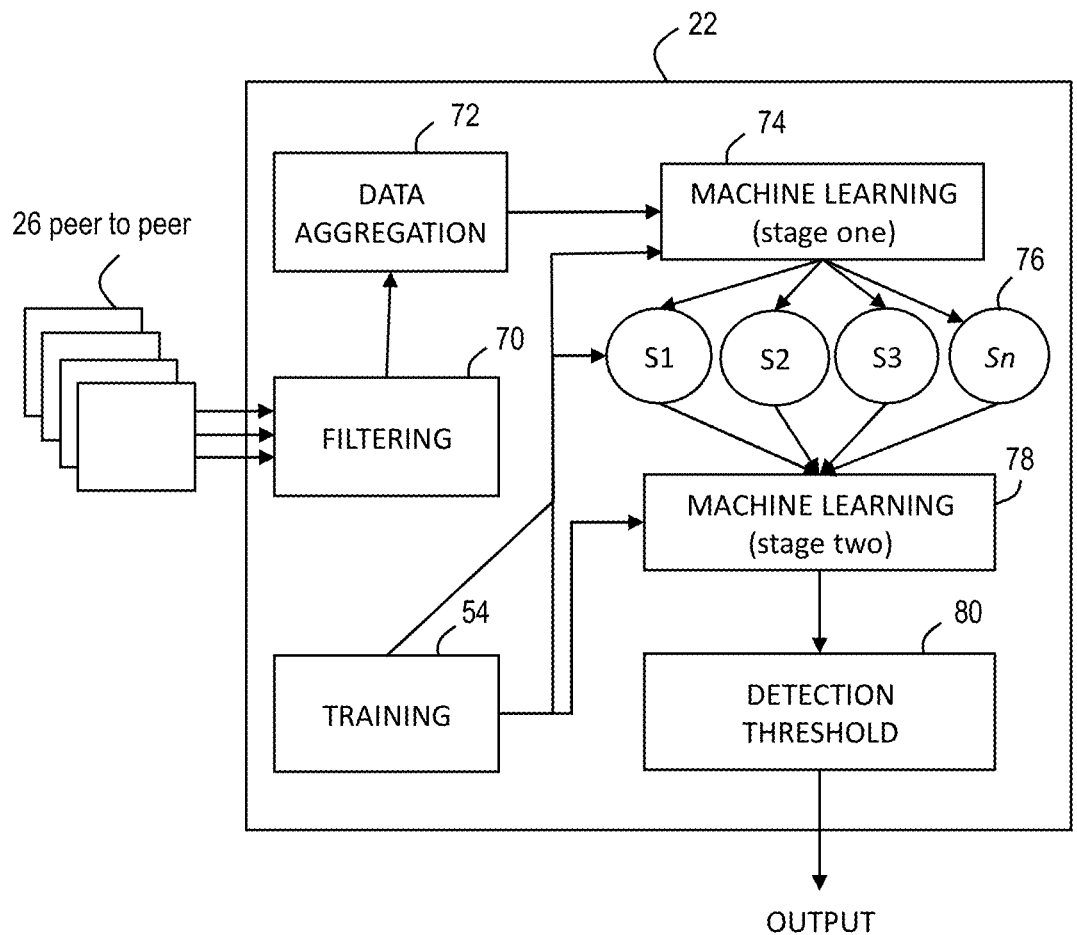
FIG. 6 is a schematic of a system for occupancy detection and counting of human objects according to the present invention.

Referring to FIG. 6, controller 22 is programmed to receive single or multiple metadata streams from peer-to-peer network 26, or from network 24 or even the internet. Controller 22 may include a filtering module 70 to remove any invalid data. Incoming data is then passed to a data fusion engine 72 where cross-device data is constructed and correlated. For example, metadata from multiple devices related to a specific device may be aggregated over a predetermined time horizon along with infrastructure device states that are aggregated into a single payload unit for machine learning engine, stage one 74. The results of machine learning engine stage one 74 are output in multiple channels 76 to machine learning engine, stage two 78. The results of machine learning engine, stage two 78 are subject to a detection threshold 80 and then output to the external device or system that is in need of occupancy detection results. Machine learning stage one can be used to provide event identification by fusing metadata from multiple access points and other sources of metadata. For example, user location within an indoor environment will have different RSSI at various access points. Since the access points do not necessarily have line of sight to various locations, a simple triangulation is insufficient for localizing users. Instead, a training-based approach can be used for any given environment to map out the RSSI signatures and they can be used in mapping out user movement. Machine learning stage two 78 takes input from stage one 74, assisted with reasoning, to provide a more complete picture of occupancy information. For example, continuity can be used to reconstruct movement and refine the stage one output. The particular machine learning approach used to implement machine learning engine, stage one 74 and machine learning engine, stage two 78 is not critical for system 10, as several conventional approaches can provide the desired results. For example, a neural network is well suited for analyzing metadata from multiple access points to location a user within environment 12 as occurs in machine learning engine, stage one 74. Other machine learning approaches, such as kernel regression, would also suffice. Whatever machine learning approach is selected may then be trained using training data comprising any or all of the available metadata associated with wireless network signals, including the specific metadata discussed herein.

There is seen in FIGS. 7 and 8, exemplary metadata that may be extracted from environment 12 and used by system 10. The data, such as that seen in FIG. 7 are validated, then processed using algorithms produce the payload data that can potentially relate to the object of interest in the physical environment.

Data fusion engine 72 establishes relations from multiple data sources and aggregate data that correlate to a single unique object in the environment. All interested metadata that is generated by this object of interest over a time period are being packaged into a payload unit. This unit of metadata aggregate will be passed into the machine learning subcomponent as its input, along with other metadata aggregates.

As seen in FIG. 6, machine learning in connection with the present invention may comprise two separate stages 74 and 78 to provide abstraction in the training process. First stage 74 will process multiple metadata aggregates to determine the likelihood of singleton events, such as an object is in proximity of a waypoint and a point of interest in the physical space. However, this output alone is not reliable enough to accurately determine the occupancy or headcount of a given area. Thus, system 10 includes a second stage machine learning process 78 to be established as a finite state machine where the final occupancy or headcount result is registered if and only if a predetermined set of events are satisfied. The two stages of machine learning subcomponents employ different neural networks techniques and are trained independently.

Figure 9:
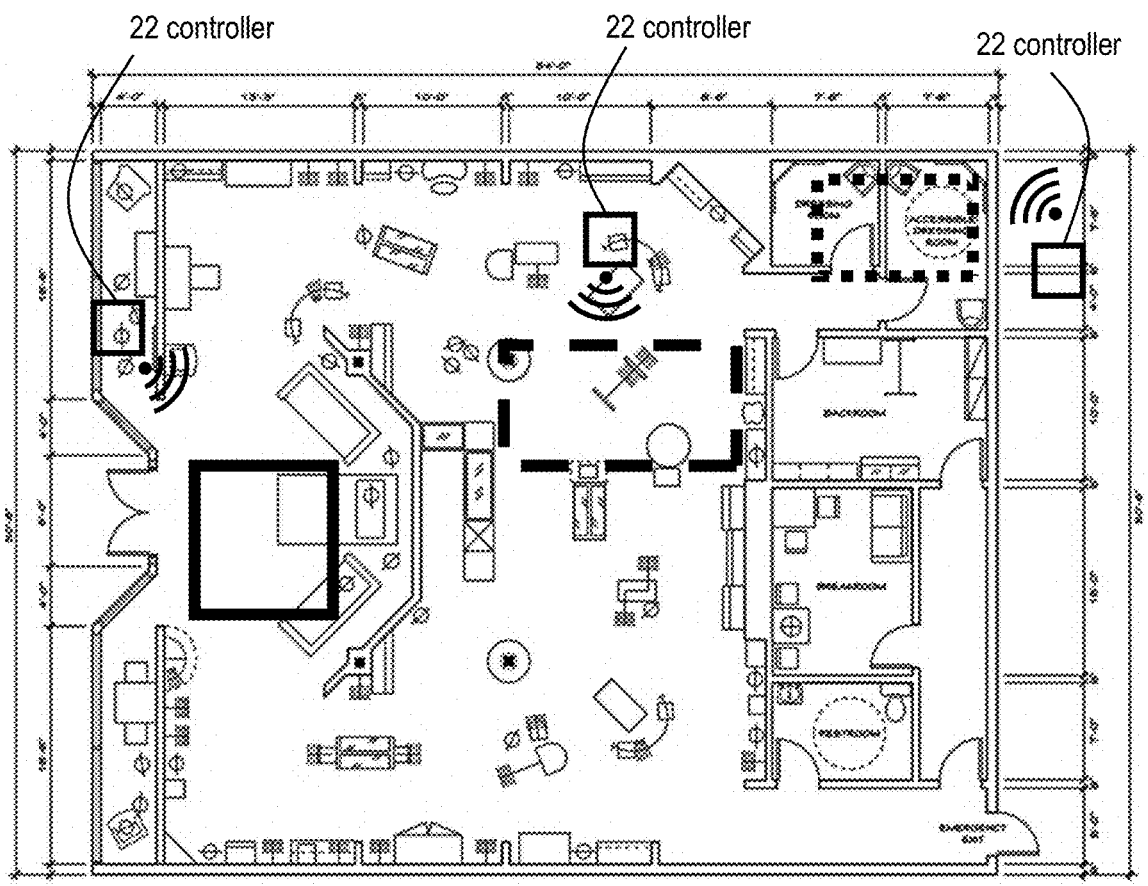
FIG. 9 is a schematic of a location illustrating how a system according to the present invention may be implemented.

FIG. 9 illustrates an exemplary scenario that demonstrates how the system of the present invention works to produce desired result. While this example uses commonly known metadata for simplicity, the metadata actually used in the system could certainly be more comprehensive or complex. FIG. 9 illustrates a map of an exemplary environment 12, such as an office or place of business. Three permanently installed commercially-off-the-shelf infrastructure devices (Wi-Fi access points) are shown, and these are existing access points installed by the owner to provide WiFi coverage for employees and customers. The coverage graph is for illustration, as actual signal propagation may depend on many other factors in the environment. Each access point has a different configuration (channel, tx power, etc.) and is configured to act as a source of metadata for system 10. Assuming an interest in occupancy or headcount in the highlighted areas, the final output of system 10 will represent the occupancy status of this area. Other interested areas are also enclosed in the rectangular boxes seen in FIG. 9.

Assuming a human object entering environment 12 will never directly associate with any of access points in the space (e.g., the device of the user will not connect to the provided WiFi network), IEEE802.11 probe requests alone may be used to determine occupancy according to system 10 of the present invention. An IEEE 802.11 probe request is an active scan process used by almost all modern mobile devices to facilitate connecting to an WiFi network where the devices will transmit this request as an attempt to connect to a known WiFi network. While this request is unencrypted, newer mobile devices will regularly randomize the device's MAC address used in such request to protect the device user's privacy. If a customer (referred to as "Kevin") enters environment 12 through the front door and the customer's phone transmits a probe request, receiver 18 labeled "Main Floor Front," will observe the following from its RF environment (format has been simplified):

802.11 Probe Request—RSSI: −73 dBm—FROM 12:34:56:78:AB:CD—SSID List: "Kevin's Home WiFi", "AirOrangeX", "Cable-WiFi", "Spectrum-WiFi"

For simplicity of illustrating system 10, only metadata in this data frame is considered, but it should be recognized that other metadata could also be used. In particular, the RSSI of the IEEE 802.11 probe request indicates the relative signal strength of the signal, which has a vague correlation to the transmitter's proximity to the access point, is considered. As explained above, to protect user privacy, receiver 18 is programmed to replace the "FROM" MAC address with a unique identifier that is a one-way hash of the MAC, and this UID will remain common through system 10. Receiver 18 then encapsulates and sends this metadata as artifact 20 to occupancy detection controller 22 of system 10. The data sent to controller 22 may be as follows:

RSSI: −73 dBm, FROM uid_48HekJ84, timestamp :1602503400

Data aggregation engine 72 of controller 22 may then aggregate all related data from any other access points acting as receivers 18. For example, if controller 22 receives the same UID in any artifacts 20 from other receivers 18, the data of the artifacts will be aggregated and sent to the machine learning stage one 74, such as follows:

AP_MainFloor_Front,tx_power: 23 dBm, RSSI: −73 dBm, FROM uid_48HekJ84, timestamp :1602503400

AP_MainFloor_Rear,tx_power: 23 dBm, RSSI: −89 dBm, FROM uid_48HekJ84, timestamp :1602503400

Machine learning stage one 74 is configured to reach a conclusion that there is a probability that one or more occupancy events (S1, S2, S3 . . . Sn) 76 have occurred at predetermined locations within environment 12. Machine learning stage two 78 is configured to make occupancy conclusions about environment 12 based on occupancy events 76 as determined by machine learning stage one 74.

Machine learning stage one 74 is configured to apply a probability threshold when determining occupancy events 76 that is set to be above the overall threshold of system 10 for the final determination of occupancy. In the present example, machine learning stage one 74 makes a first determination of the occurrence of an occupancy event based on artifact 20, and any other artifacts 20 received and aggregated therewith, indicating that there has been an IEEE 802.11 probe request from Kevin's personal device. The determination of an occupancy even by machine learning stage one 74 is referred to as occupancy event S1," which is flagged as TRUE (or, of course, FALSE if no IEEE 802.11 probe request was received).

If the customer, Kevin, continues to move through environment 12 and walks past the dashed line box of FIG. 9, but his personal device does not transmit anything, the physical presence of Kevin will nevertheless affect the signal propagation for devices connected to the "Main Floor Front" receiver 18. Receiver 18 thus experiences a degradation to RSSI and data rate across all devices that are currently connected to receiver 18. Receiver 18 thus reports thus degradation as an artifact 20 to controller 22 and data aggregation engine 72 forwards this information to machine learning stage one 74. Machine learning stage one 74 then determines that, based on its trained machine learning algorithm, that motion has occurred in the location within environment 12 illustrated by dotted line box. This decision forms produces another occupancy event, referred to as S2, that is flagged as TRUE (or FALSE if no motion was detected due to the lack of any sufficient degradation to RSSI and data rate as determined by machine learning stage one 74).

If Kevin continues to walk through environment 12 and enters another predetermined location in environment 12, such as the dotted line box of FIG. 9, his personal device might transmit another probe request. The closest receiver 18 will report receipt of this request to controller 22 as described above, so that machine learning stage one 74 will receive the following data (as an example):

AP_Basemnet,tx_power: 4 dBm, RSSI: −89 dBm, FROM uid_48HekJ84, timestamp :1602503408

AP_MainFloor_Rear,tx_power: 23 dBm, RSSI: −89 dBm, FROM uid_48HekJ84, timestamp :1602503408

In this example, receiver 18 located closest to Kevin is transmitting at significantly lower power, but all receivers 18 detect the same RSSI value indicating identical signal strength. Machine learning stage one 74, because it is based on an artificial intelligence algorithm, can compensate for these variations to still produce the correct output, e.g., the occurrence of an occupancy event in environment 12, referred to as S3, that is flagged as TRUE (or, of course, FALSE if no IEEE 802.11 probe requests were received by that receiver 18). Referring to FIG. 9, based on the system of the present invention, the event C is fired indicating human presence in the red rectangular area.

The sequence of occupancy events, (S1, S2, S3 . . . Sn), are passed to machine learning stage two 78, where a neural network forming the core of machine learning stage two 78 then makes a determination that based on its trained model, i.e., machine learning stage two 78 determines the final probability of a human object within environment 12. For example, as an oversimplification, machine learning stage two 78 determines that events S1, S2, and S3 indicate that a human has entered environment because IEEE 802.11 probe request were received in two locations at two points in time and potential movement was detected in a location between those two locations between those two points of time. Machine learning stage two 78 can thus provide a final output accordingly with a given confidence threshold. The same approach can be applied in reverse for a human object to vacate the space. It should be recognized that above example is over-simplified and provided to assist in illustrating the approach used by system 10 of the present invention. As is known in the art, the more inputs provided to machine learning stage one 74 and machine learning stage two 78, the more closely the results will represent actual events in environment 12. Machine learning stage one 74 and machine learning stage two 78 are preferably independently trained to improve detection accuracy and can be retrained or continuously improved after deployment to further improve accuracy.

In the example of FIG. 9, there may be more than one path for a human to reach the final destination rectangle from the first rectangle. If this were not the case, system 10 could implement exploit a direct logical analysis as a human could only be present in the final destination rectangle IF AND ONLY IF a motion event was fired in the intermediate rectangle due to the presence of only one path, thereby eliminating a significant amount of false positives (and potentially false negatives) experienced by traditional single event detection methods. However, in a real world application, there might be thousands to millions of metadata points evaluated for each occupancy event to be deemed to have occurred in the first stage, and the second stage evaluates whether the events of the first stage have occurred in a particular sequence that resulting in a determination of actual occupancy.

Generally, two types of information are present and useful for system 10. First, the information generated by devices associated with the human subjects (i.e., user carried devices) may be used. Second, information generated by other transceivers for which the human subjects are part of the channel environment may be used. For the former, the presence of a human in a particular environment and his/her movement are often reflected in the metadata. For the latter, propagation channels of affected transceiver pairs will undergo variations induced by human movement. Both types of information, when available, may be passed to a data fusion system and, after some preliminary processing at the receiver, a suite of machine learning/artificial intelligence algorithms are used to compute the desired output. Such output may include occupancy information of various rooms/zones/floors of a building for lighting/HVAC control. The output may also include a heat map for crowd tracking in a given environment for efficient services/business operations.

It should be recognized that metadata can be extracted from signals available from devices in the environment that are not conventional wireless communication signals. In other words, a "signal" can be any device data, not just signals being used to facilitate wireless communication. For example, the opening of a door that cause sunlight to shine on a wireless access point will cause temperature change on the circuit board of the access point. The signal reflecting temperature can be used as metadata for system 10, along with any other signals of the access point (e.g. processor clock, tx power, tx data rate), to determine occupancy.

In one aspect, the present invention applies to acquiring such signals, data and metadata via meshed passive observers (wireless receivers). For example, infrastructure devices such as wireless access points, particularly those deployed in an enterprise environment, are capable of acquiring existing information in the wireless media access control layer as well as many high-level information such as client association status. Such information can be obtained from multiple wireless access points with proximity to the interested environment to collectively produce the desired result for improved reliability, accuracy, and coverage. Information from multiple interested sources can also be combined to produce the desired output. For example, a given interested human object might be carrying more than one device transmitting identifiable signals. The characteristics of such signals from all of the devices that the human object is carrying will undergo similar variation when the subject moves around; this information can be used to associate multiple devices with a singular human object, thereby improving the accuracy of the result.

In another aspect, the present invention leverages existing wireless hardware to achieve the task of quantifying the present of human objects without the need of additional hardware to be installed.

In a further aspect, the present invention uses wireless metadata, such as a WiFi station's physical address, basic service set identifier (BSSID), received signal strength indicator (RSSI) to determine the condition of a physical space. The metadata can also include the WiFi station's uptime, load, circuit board temperature, firmware version, and noise. In a multi-sensor setup, a unique signature of the signals of interest (SoI) or signals of opportunity is generated and transmitted either to a central controller or to other sensors in a peer-to-peer fashion to be processed together to produce desired output. The metadata can be provided by the transmitting device or the receiving device, agnostic to the payload data (i.e. encrypted or unknown format).

What is claimed is:

1. A system for determining occupancy, comprising:
    a hardware receiver programmed to observe a signal emitting from at least one device positioned in an environment, wherein the receiver is programmed to extract a set of metadata about the signal that includes media access control layer information, to generate an artifact based on the set of metadata including media access control layer information, and to transmit the artifact including media access control layer information; and
    a hardware controller in communication with and programmed to receive the artifact from the receiver and to process the artifact with a machine learning engine to determine any occupancy in the environment based on the artifact including media access control layer information.

2. The system of claim 1, wherein controller is further programmed to aggregate the artifact with at least a second artifact received from a second receiver and to determine the occupancy in the environment based on the aggregated artifacts.

3. The system of claim 2, wherein the machine learning engine comprises a first stage configured to process the aggregated artifacts to identify a series of events related to the occupancy within the environment.

4. The system of claim 3, wherein the machine learning engine comprises a second stage configured to process the series of events identified by the first stage of the machine learning engine to determine the occupancy within the environment.

5. The system of claim 4, wherein the first stage of the machine learning engine has been trained with a training set of metadata to determine when the extracted set of metadata indicates an occurrence of one of the series of events related to the occupancy within the environment.

6. The system of claim 5, wherein the second stage of the machine learning engine has been trained with a training series of events to determine how the series of events identified by the first stage of the machine learning engine indicates the occupancy within the environment.

7. A method of determining occupancy, comprising the steps of:
    observing with a hardware receiver a signal emitting from at least one device positioned in an environment, wherein the receiver is programmed to extract a set of metadata from the signal that includes media access control layer information, to generate an artifact based on the set of metadata including media access control layer information, and to transmit the artifact including media access control layer information; and
    receiving the artifact including media access control layer information from the receiver with a hardware controller that is in communication with the receiver; and
    processing the artifact with a machine learning engine of the controller to determine any occupancy in the environment based on the artifact including media access control layer information.

8. The method of claim 7, further comprising the step of aggregating the artifact with at least a second artifact received from the first or a second receiver and processing the aggregated artifacts to determine the occupancy in the environment based on the aggregated artifacts.

9. The method of claim 8, wherein the step of processing the artifact with a machine learning engine comprises using a first stage of the machine learning engine to process the aggregated set of artifacts to identify a series of events related to the occupancy within the environment.

10. The method of claim 9, wherein the step of processing the artifact with a machine learning engine comprises using a second stage to process the series of events identified by the first state of the machine learning image to determine the occupancy within the environment.

11. The method of claim 10, further comprising the step of training the first stage of the machine learning engine with a training set of metadata to determine when the set of metadata extracted from the signal indicates an occurrence of one of the series of events related to the occupancy within the environment.

12. The method of claim 11, further comprising the step of training the second stage of the machine learning engine with a training series of events to determine how the series of events identified by the first stage of the machine learning engine indicates the occupancy within the environment.

* * * * *